(12) United States Patent
Nori

(10) Patent No.: US 8,958,020 B2
(45) Date of Patent: Feb. 17, 2015

(54) ELECTRIC AND ELECTRONIC SENSOR MEANS, CONNECTED TO AN INTERFACE DEVICE FOR AN APPLIANCE FOR PROCESSING A PLURALITY OF HIGH RESOLUTION OPERATIVE PROGRAMS AND FUNCTIONS FOR DIFFERENT TYPES OF MEDIA, INTEGRATED WITH A TELEVISION RECEIVER SCREEN, FOR SETTING AND PERFORMING THE OPERATIVE PROGRAMS AND FUNCTIONS FOR DIFFERENT TYPES OF MEDIA AND DISPLAYING THE SAME ON THE TELEVISION RECEIVER SCREEN

(76) Inventor: Claudio Nori, Roveredo In Piano (PN) (IT)

( * ) Notice: Subject to any disclaimer, the term of this patent is extended or adjusted under 35 U.S.C. 154(b) by 0 days.

(21) Appl. No.: 14/232,959

(22) PCT Filed: Jul. 12, 2012

(86) PCT No.: PCT/IB2012/001416
§ 371 (c)(1),
(2), (4) Date: Jan. 27, 2014

(87) PCT Pub. No.: WO2013/011374
PCT Pub. Date: Jan. 24, 2013

(65) Prior Publication Data
US 2014/0152903 A1    Jun. 5, 2014

(30) Foreign Application Priority Data

Jul. 15, 2011 (IT) .............................. PN2011A0051

(51) Int. Cl.
*H04N 5/66*       (2006.01)
*H04N 21/422*   (2011.01)
(Continued)

(52) U.S. Cl.
CPC ............... *H04N 5/66* (2013.01); *H04N 21/422* (2013.01); *H04N 21/42201* (2013.01);
(Continued)

(58) Field of Classification Search
USPC ................. 348/739, 790, 791, 725, 552, 553; 725/9, 37, 38, 40
See application file for complete search history.

(56) References Cited

U.S. PATENT DOCUMENTS 5,995,155 A * 11/1999 Schindler et al. ............. 348/461
6,970,098 B1  11/2005 Adams
(Continued)

FOREIGN PATENT DOCUMENTS

EP    2 340 878    7/2001
EP    1 865 719   12/2007
(Continued)

OTHER PUBLICATIONS

International Search Report of PCT/IB2012/001416, date of mailing Sep. 14, 2012.

*Primary Examiner* — Paulos M Natnael
(74) *Attorney, Agent, or Firm* — Collard & Roe, P.C.

(57) ABSTRACT

An electric and electronic sensor for selecting high resolution operative programs and functions of different types of media, connected to an interface device (2) for an appliance for processing a plurality of high resolution operative programs and functions of different types of media, integrated with a television receiver screen (7), for setting and performing the operative programs and functions of different types of media for personal computers and television receivers, and displaying them on the television receiver screen (7). The sensor includes a set of sensors (12-18) connected to a microprocessor (1) of the interface device (2) and adapted to select the operative programs and functions.

6 Claims, 1 Drawing Sheet

(51) Int. Cl.
*H04N 21/4223* (2011.01)
*H04N 21/4415* (2011.01)
*H04N 21/442* (2011.01)
*H04N 5/44* (2011.01)

(52) U.S. Cl.
CPC .. *H04N 21/42202* (2013.01); *H04N 21/42203* (2013.01); *H04N 21/4223* (2013.01); *H04N 21/4415* (2013.01); *H04N 21/44218* (2013.01); *H04N 2005/4428* (2013.01); *H04N 2005/4432* (2013.01)
USPC .......................................................... 348/739

(56) References Cited

U.S. PATENT DOCUMENTS 7,987,147 B2 * 7/2011 Ohtani et al. .................... 706/45
2003/0052911 A1 3/2003 Cohen
2003/0147624 A1 * 8/2003 Trajkovic et al. ............... 386/46
2006/0242662 A1 * 10/2006 Masaki et al. ..................... 725/9
2011/0162004 A1 * 6/2011 Yerli .............................. 725/37
2013/0127980 A1 * 5/2013 Haddick et al. ............ 348/14.08

FOREIGN PATENT DOCUMENTS

| EP | 2 333 778 | 6/2011 |
| IT | PN2005A000038 | 6/2005 |
| IT | PN2006A000069 | 9/2006 |
| IT | PN2010S000006 | 1/2010 |
| WO | WO 02/32136 | 4/2002 |
| WO | WO 02/080546 | 10/2002 |

* cited by examiner

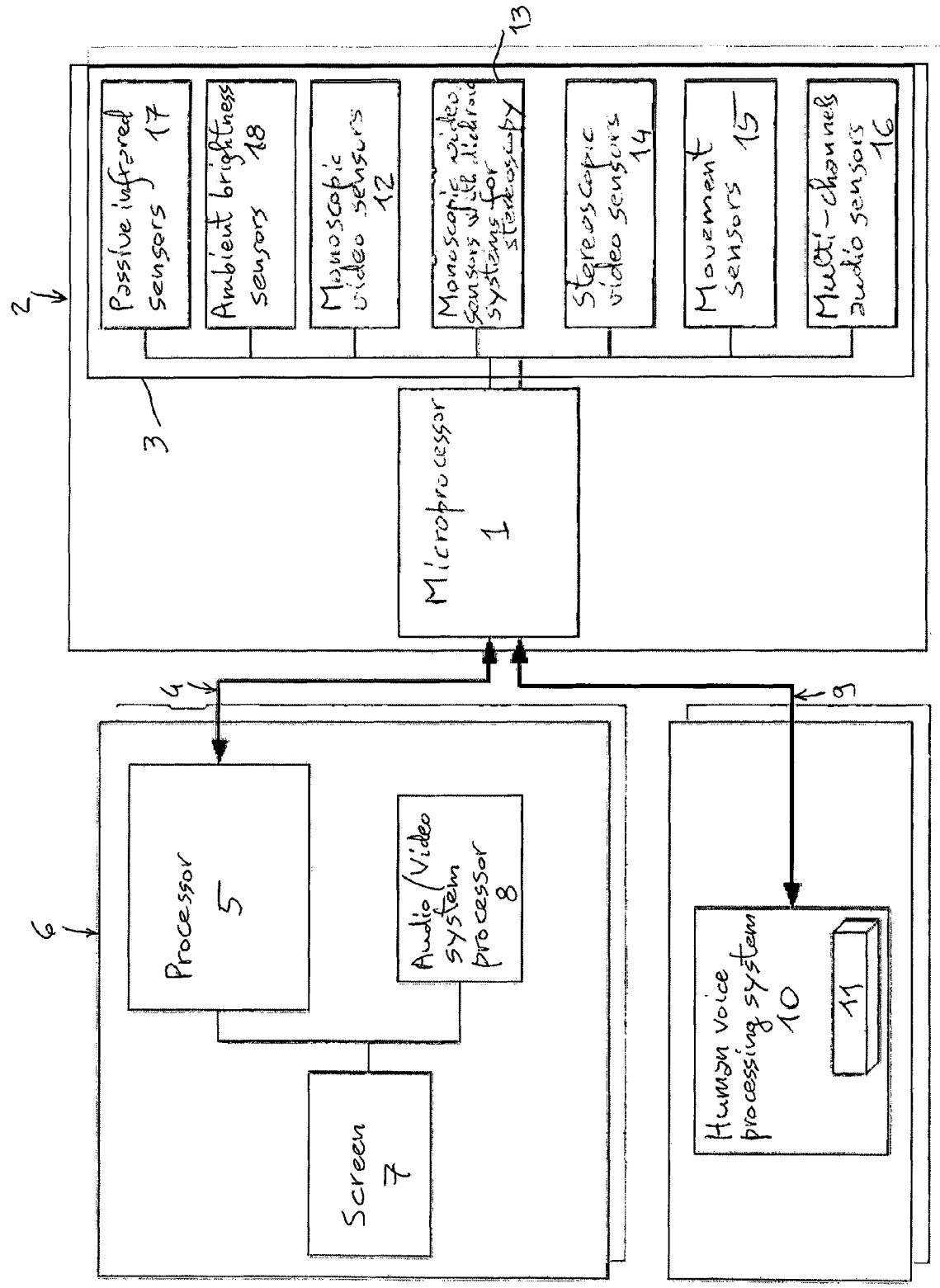

ELECTRIC AND ELECTRONIC SENSOR MEANS, CONNECTED TO AN INTERFACE DEVICE FOR AN APPLIANCE FOR PROCESSING A PLURALITY OF HIGH RESOLUTION OPERATIVE PROGRAMS AND FUNCTIONS FOR DIFFERENT TYPES OF MEDIA, INTEGRATED WITH A TELEVISION RECEIVER SCREEN, FOR SETTING AND PERFORMING THE OPERATIVE PROGRAMS AND FUNCTIONS FOR DIFFERENT TYPES OF MEDIA AND DISPLAYING THE SAME ON THE TELEVISION RECEIVER SCREEN

CROSS REFERENCE TO RELATED APPLICATIONS

This application is the National Stage of PCT/IB2012/001416 filed on Jul. 12, 2012, which claims priority under 35 U.S.C. §119 of Italian Application No. PN2011A000051 filed on Jul. 15, 2011, the disclosure of which is incorporated by reference. The international application under PCT article 21(2) was published in English. This application is a continuation-in-part of application Ser. No. 11/922,362, filed Jan. 10, 2008.

BACKGROUND OF THE INVENTION

1. Field of the Invention

The invention relates to electric sensor means connected to an interface device for an appliance for processing a plurality of high resolution operative programs and functions of various kind for different types of media, integrated with a television receiver screen, adapted to allow to set and perform such operative programs and functions for different types of media and to display the same onto such screen.

2. Description of Related Art

It is known an appliance for processing a plurality of high resolution operative programs and functions for different types of media, integrated with a television receiver screen, for setting and displaying such operative programs and functions for different types of media onto the same screen.

In particular, this appliance is adapted to permit to set and display such operative programs and functions onto at least a television receiver screen of any type (LCD, LED, plasma etc . . . ), included into the same appliance or into separated external appliances, and is characterized by main electronic control means such as at least a master or main microprocessor for controlling and managing informatics analog and digital data in general and data of the operative programs and functions for personal computers and television receivers of various kind; by video signals processing means such as a video processor connected to both the master microprocessor and the television screen, so as to receive and process video signals of any type depending on the informatics data of the operative programs and functions which have been respectively set and processed through such master microprocessor, and for displaying such video signals on to the video screen; by audio signals processing means such as an audio processor connected to both the master microprocessor and the sound reproducing transducers, for processing and reproducing the audio signals depending on the informatics data and the operative programs and functions which have been respectively set and processed through such master microprocessor; by selector means for the input of analog and digital video and audio signals of various kind, which are transmitted via radio, cable, wires, optical fibres and the like, which selector means are connected to the video processor and the master microprocessor through a BUS control line, which in turn is connected to both the audio processor and a graphic module for processing the video signals; and is also characterized by first, second and third electronic control means of the inputted and outputted informatics data in general and the data of the operative programs and functions for personal computers and television receivers with respect to the appliance and the external peripheral appliances, which are connected operatively to the same appliance, said first electronic control means being constituted by a remote control circuit formed by a receiver/detector connected operatively to the master microprocessor through a multiplexer switch and the BUS control line, and being adapted to receive and to transmit informatics data via radio, cable, wire, optical fibres or the like, which data are set in advance into external peripheral appliances such as remote controls, keyboards and mouses of personal computers, appliances connected to the Internet network, and the like, appliances interacting with this remote control circuit, for displaying the images and reproducing the sounds contained into such data, and these data are received by the appliance referred to and transmitted to the peripheral appliances for displaying the images and reproducing the sounds contained into the same data. Moreover, this remote control circuit allows to set and to select directly into the peripheral appliances the operative programs and functions for personal computers and television receivers, and to check the functions of the most different kinds, to be performed in the appliance referred to. In turn, the second electronic control means are adapted to receive and to transmit audio data and to set and select via radio, cable, wires and the like the operative programs and functions for personal computers and television receivers and are constituted by at least a multiplexer switch connected to the audio processor and the BUS control line connected to the master microprocessor. Besides, the third electronic control means are adapted to receive and transmit, via radio, cable, wires, optical fibres and the like, informatics data in general and analog and digital video and audio data of the operative programs and functions for personal computers and television receivers and are constituted by at least an access gate, connected with its inputs to a plurality of peripheral appliances of various kind and with one or more of its outputs to the master microprocessor, through the BUS control line. This processing appliance is also characterized in that the master microprocessor is adapted to control and manage the data exchange among it and the input selector means and the first, second and third electronic control means, and among it and correspondent electronic control means of external electronic appliances and/or systems, which are connected permanently or temporarily with this appliance, and that the master microprocessor is set for receiving at its input informatics data in general and analog and digital data of the operative programs and functions which have been set through such first, second and third electronic control means and the correspondent control means of the external electronic appliances and/or systems, in order to manage and process the same data and to transmit correspondent response output signals adapted to control the carrying out of the operative programs and functions which have been set, and the means for processing the video signals and the audio signals of this appliance and the external electronic appliances and/or systems, by displaying the correspondent images on to the television screen and reproducing the correspondent sounds in the audio transducer means of this appliance and the correspondent television screens and audio transducers of the external electronic appliances and/or systems, and being adapted to check and inspect also the correct operation and the carrying out of the operative programs and functions of this appliance and the external electronic appliances and systems, so as to signal and in case correct automatically any not correctly performed operation, or to signal also any possible operative failure or defect of this appliance and the external electronic appliances and systems.

Besides, such master microprocessor is connected with its outputs to a mass storage unit (hard disk) and an optical writer/reader device of traditional type.

It is also known a system for processing in a real time the human voice for controlling data and functions of various kind in an appliance of the above mentioned type, which is adapted to select and control a plurality of data relating to the high resolution operative programs and functions of different types of media, which must be performed in the appliance referred to and the external electronic appliances and/or systems, which are connected operatively to the same appliance. Such system is characterized by at least a microphone connected, through control means, analog-digital converter means, transmitter means, receiver means, decoder and receiver means for voice control and ground noises filtering means, with voice analyzer means is adapted to recognize the tone, the timbre and the volume of the human voice and the phonemes pronounced in front of this microphone, and which have been re-ordered in the form of digital signals coded into proper data banks, stored into storage means of the appliance, together with the database of the controls for the operative programs and/or functions which must be performed from time to time in the electronic appliances and/or systems, and which are displayed and identified through a suitable window of the relative appliance and/or system, said voice analyzer means being connected through a BUS control line to said main electronic control means and being arranged with an operative program adapted to be submitted to an initial training step and a possible learning step, in such a way as to recognize in one or more times the phonemes and/or the vocal controls which have been given through said microphone and to generate as response a determinate type of coded digital signal adapted to control the relative electronic components, to provide for carrying out of the correspondent operative programs and/or functions and, in the case of failure of recognizing of such phonemes and/or the vocal controls, even in the case in which they have not yet introduced into the database, with relative refusal of the same phonemes and/controls, said operative program being adapted to display in the screen the similar phonemes and/or all the controls contained into the stored database, so as to select, through a remote control apparatus of the appliance, the correct phonemes and/or controls corresponding to the given phonemes and vocal controls, which are introduced into said operative program, with consequent automatic change and correction of such phonemes and/or vocal controls and carrying out of the selected operative programs and/or functions, and storage into the database thereof, and activation of the relative electronic control components for carrying out the respectively selected operative programs and/or functions.

Finally, it is known an interface device associated with a known appliance of the kind referred to, which is connected to peripheral appliances of the most different types, which device is controlled manually or by means of a remote control apparatus, and is so set as to receive input signals of a plurality of operative programs and functions of different types of media, of the same type and also of different type with respect to those available with said processing appliance, and coming from such peripheral appliances, which programs and functions are selected manually or by means of a remote control apparatus, and is also set for generating corresponding output signals adapted to display onto the screen of the appliance referred to the selected operative programs and functions, as well as to reproduce in the same appliance the sounds contained into such so selected operative programs and functions. Moreover, such interface device may also interact with the related peripheral appliances, controlled manually or by means of a remote control apparatus, in such a manner that to change at will the operative programs and functions which have been selected into the same peripheral appliances, and to generate corresponding modified output signals adapted to display on to the screen of the appliance referred to these modified operative programs and functions, as well as to reproduce in the same appliance the sounds contained into these modified operative programs and functions. Finally, such interface device may also interact with the peripheral appliances, controlled manually or by means of a remote control apparatus, in such a manner to change at will the operative programs and functions selected into one or more of the same peripheral appliances, and to generate corresponding modified output signals which are transmitted to additional and different peripheral appliances, in order to be added to the operative programs and functions of these additional and different peripheral appliances, by modifying them as desired, and to display on to the screen of the appliance referred to these additional operative programs and functions, as well as to reproduce in the same appliance the sounds contained into these additional operative programs and functions.

SUMMARY OF THE INVENTION

The invention relates to electric and electronic sensor means, connected to an interface device and in case also to a vocal control system of the types described as above, in order to allow for setting, performing and displaying the operative programs and functions of different types of media on to the screen of an appliance of the type referred to.

BRIEF DESCRIPTION OF THE DRAWING

The invention will be better understood from the following description, given by way of not limiting example only, and with reference to the single accompanying FIGURE, showing the block diagram of the above mentioned electric and electronic sensor means.

DETAILED DESCRIPTION OF THE INVENTION

The electric and electronic sensor means in accordance to the invention, which will be described hereinafter with reference to the block diagram indicated in the attached FIGURE, are included into an interface device associated with an appliance for processing a plurality of high resolution operative programs and functions of various kind of different types of media, integrated with the screen of a television receiver, for setting and displaying on to the screen the operative programs and functions of both the television receiver and the personal computer, wherein such interface device and processing appliance are described synthetically in the known state of the art described in the above introductory part of the present patent application, and the interface device is described and claimed in the patent application for invention n. PN2010A000006, filed on 28.1.2010, while the processing appliance is described and claimed in the patent application for invention n. PN2005A000038, filed on 15.6.2005. The disclosures of these applications are herein incorporated by reference. Therefore, in the following description all the component parts of the known patent applications will not be described in detail, but there will be described only the component parts relevant for the present invention.

To this aim, in the block diagram of the present invention it is represented an electronic microprocessor 1 of the interface device 2, included into a separate electronic card (not indicated) and connected operatively to a set of electric and electronic sensor circuits 3, formed by the electric and electronic sensors which will be described for performing the functions which will be described too. Such electronic microprocessor 1, which is foreseen for being set in the manner and for the functions which will be described, in turn is connected operatively with a BUS line 4 to a master microprocessor 5 of the above specified appliance for processing a plurality of high resolution operative programs and functions of different types of media, which is integrated with a television receiver screen for achieving the setting and performance of such operative programs and functions and displaying thereof on to such screen and reproducing the sounds into said audio processor and transducers for reproducing the sound of such appliance. This master microprocessor 5 is supplied by the electric supply line, together with the microprocessor 1 and the electric and electronic sensors 3 of the interface device 2, and is included into a separate card 6, together with the electronic control and processing circuits (which aren't indicated in the enclosed schema, but are described in detail in the above indicated Italian patent application n. PN2005A000038), in order to display or not display on to the screen 7 of the appliance referred to, which is connected to and controlled by a video card (not shown) connected operatively to the master microprocessor 5, the images of the selected or received operative programs and functions of different types of media, and to reproduce the sounds in the audio processors and the sound reproducing transducers of such appliance, which for simplicity are indicated with the electronic block 8 in the enclosed FIGURE, which is connected operatively with the master microprocessor 5. Thanks to the presence of the BUS line 4, it is so possible to effect an exchange of electronic and digital informations between the master microprocessor 5 of the appliance referred to and the microprocessor 1 of the interface device, which informations are selected by acting on one or different circuits of electric and electronic sensors 3, and are introduced into and processed by the microprocessor 1, which in turn transmit them to the master microprocessor 5 so as to provide for controlling and displaying on to the screen 7 the various programs and the various functions which have been selected through said sensor circuits, and reproducing the sounds thereof in the block 8.

Besides, the master microprocessor 5 is able to provide some coded response informations to the microprocessor 1, for recognizing the operative programs and functions which are activated from time to time in the appliance referred to and displayed or not displayed on to the screen 7, and reproduced with their sounds in the block 8, and these informations exchanged between the microprocessors 1 and 5 through the BUS line 4 are generated and transmitted and/or received in the manner and for the functions which will be described. Furthermore, the microprocessor 1 of the interface device 2 is connected operatively through an additional BUS line 9 to the human voice real time processing system 10, for controlling data and functions of various kind, which system is included into the above appliance for processing a plurality of high resolution operative programs and functions of different types of media, and has been synthetically commented in the known state of the art, which has been described and claimed in the patent application for invention n. PN2006A000069, filed on 13, Sep. 2006. Therefore, also in this case in the following description there will not be described in detail all the component parts of such previous patent application, but there will be described only the component parts relevant for the present invention.

To this aim, these relevant component parts are substantially constituted by said main electronic control means, consisting of a master or main microprocessor 11 which is set and operates in a manner identical to that described in said patent application n. PN2006A000069, such master microprocessor 11 being connected through the BUS line 9 to the microprocessor 1 of the interface device 2, for effecting in this way an exchange of electronic and digital informations between the microprocessors 1 and 11, and between these two microprocessors 1, 11 and the master microprocessor 5 of the appliance for processing a plurality of high resolution operative programs and functions of different types of media, which informations are selected by acting on one or different circuits of electric and electronic sensors 3, and/or also on the microprocessor 11 for real time processing the human voice, and such informations are so introduced into and processed by the microprocessor 1, which in turn transmit them to either one or both the microprocessors 5 and 11, to provide for controlling and displaying on to the screen 7 the various programs and the various functions selected through said sensor circuits and/or said vocal control system 10, and reproducing their sounds in the block 8. There are now described the mode for setting and operating the microprocessor 1 of the interface device 2, and some examples of the different electric and electronic sensor circuits 3 connected to such microprocessor 1, as well as the modes for selecting the operative programs and functions of different types of media in the appliance referred to, by acting on to said sensor circuits and/or also on the vocal control system 10. In particular, as already described in the patent application n. PN2010A000006, the microprocessor 1 is set in advance for controlling, depending on the selections effected through the different sensor circuits 3 and/or also the vocal control system 10, and through the master microprocessor 5, the images displayed on to the screen 7 and the sound reproduced in the electronic block 8, of the so selected different operative programs and functions, and such microprocessor 1 is also set for controlling and checking all the response signals produced by the different component parts activated by the appliance referred to, which are processed and received through the master microprocessor 5, in order to manage correctly all the operative programs and functions which have been selected as described.

In turn, the circuits of electric and electronic sensors 3 are provided for selecting such operative programs and functions of the processing appliance as above described, by acquiring directly by the user of the movements and gestures spaced away from the sensor circuits, without requiring by the same user the direct manipulation of these sensor circuits and/or the use of remote control apparatuses or similar devices, as well as without requiring that the user pushes, touches or skims any possible device interacting with these sensor circuits. In turn, even the vocal control system 10, when it is also employed for selecting the operative programs and functions in the appliance referred to, is activated directly by the voice emitted by the user in to at least a microphone associated to such vocal control system, and the configuration and operation thereof are described in detail in said patent application n. PN2006A000069. There are now described, in a not limitative way, some examples of embodiments of the circuits of electric and electronic sensors 3 represented in the enclosed circuital scheme of the present patent. These examples of sensor circuits are constituted by monoscopic video sensors, indicated with the electronic block 12, by monoscopic video sensors with dichroic systems for stereoscopy, indicated with the electronic block 13, by stereoscopic video sensors indicated with the electronic block 14, by movement sensors indicated with the electronic block 15, and by multi-channels audio sensors indicated with the electronic block 16, of which all these circuits are connected electrically and operatively to the microprocessor 1 and are realized and operating as it will be described hereinafter. Moreover, it is to point out that additional sensor circuits can be in case foreseen and they may also be passive infrared sensors, indicated with the electronic block 17, and ambient brightness sensors, indicated with the electronic block 18, and realized and operating like those described in the patent application n.

PN2010A000006, and therefore they will not taken into account for the effect of the present invention. The monoscopic video sensors (electronic block 12) are constituted by at least a colour television camera (not shown), able to shoot moving colour images of the space in front of the sensor. Such colour images have a middle and a high resolution. Some examples of this type of monoscopic sensors are the colour television cameras with CMOS sensors of 2 MPixel and over, interfaced with the microprocessor 1 by means of an USB line, a line Ethernet with IP protocol or via composite video signals. The monoscopic video sensors with dichroic systems for stereoscopy (electronic block 13) are constituted buy at least a monoscopic colour television camera (not shown), integrated with a dichroic system for stereoscopy. Still utilizing a single CMOS sensor, this type of sensor is able to shoot moving stereoscopic colour images of the space in front of the sensor. The colour images have a middle and a high resolution. Some examples of these sensors are the monoscopic colour television cameras with CMOS sensors of 2 MPixel and over, integrated with a dichroic system for stereoscopy, interfaced with the microprocessor 1 by means of an USB line, a line Ethernet with IP protocol or via composite video signals.

The stereoscopic video sensors, indicated with the electronic block 14, are constituted by a stereoscopic colour television camera, composed of an assembly of two monoscopic colour television cameras, linked mechanically and synchronized to each other. Such sensor is able to shoot moving stereoscopic images of the space in front of the sensor. The colour images have a middle and a high resolution. An example of these sensors are the stereoscopic television cameras with CMOS sensors of 2 MPixel and over, interfaced with the microprocessor 1 by means of an USB line, a line Ethernet with IP protocol or via composite video signals.

The movement sensors, indicated with the electronic block 15, are constituted by sensors able to detect the presence of moving objects into their operative range.

The sensors utilized for this purpose are preferably sensors with active microwave or ultrasound based technology, integrated with passive infrared sensors, able to detect moving objects into a space of 1 to 5 meters. An example of these sensors are the sensors normally used in the household alarm systems. The multi-channel audio sensors, indicated with the electronic block 16, are constituted by sensors able to receive sounds and noises. By utilizing some multi-channel systems with adequately spaced and oriented sensors, the received sounds and noises may come from different zones of the space in front of the sensors. An example of these sensors are the directional microphones, mounted in such a position as to cover distinct and only partially overlapped zones of the space in front of the system. These informations transmitted to the microprocessor 1 may be also integrated with informations coming from the microprocessor 11 for real time processing the human voice, which receives and processes the informations of the vocal emissions of the persons who may be in case present in the surrounding space, in the same manner described in the above patent application n. PN2006A000069.

In this way, all the types of sensors described by way of example only in the electronic blocks 12-18 pick up in a real time, in the space surrounding the appliance referred to, the informations relative the presence of the persons, their posture and attitude and the movements and gestures of the same persons, as well as the sounds and noises produced by these persons, and all the picked up informations are transformed into data coded in a digital mode, which are transmitted to the microprocessor 1 for being recognized and providing for the control of the operative programs and functions of the appliance referred to, through the master microprocessor 5 of the same appliance, depending on the informations respectively selected through such sensors. For this purpose, the microprocessor 1 is set in advance with operative programs coded in a digital mode and relating the digital data of the presence, the posture and the movements and gestures etc . . . of the persons, as well as the sounds and noises produced by the same persons, in order that these operative programs be able to recognize the above specified digital data during each selection of the operative programs and functions of the appliance. In this way, for each selection of such operative programs and functions, the operative program of the microprocessor 1 provides for recognizing the digital data relating to the presence of the persons, their movements, gestures and postures etc . . . as well as the sounds and noises produced by the same persons in front of the different utilized sensors, for interpreting always correctly the indication of the person selections, and in response to the recognition of the so selected data the microprocessor 1 provides for transmitting correspondent response digital data to the master microprocessor 5, with consequent control and managing by this latter of the carrying out of the operative programs and functions selected in the appliance.

The above cited operative program of such microprocessor 1 of the interface device 2, is also set for recognizing the data coded in the digital mode of the human voice, through the vocal control system 10 and the relative microprocessor 11, as already explained previously, and in response to the recognition of the so introduced digital data it provides for transmitting correspondent response digital data to the master microprocessor 5, with consequent control and managing by this latter of the carrying out of the operative programs and functions selected in the appliance.

Furthermore, it is to point out that the operative program of the microprocessor 1 of the interface device 2 is also set for effecting an exchange of the coded digital data between it and each one of the sensors represented by the electronic blocks 12-16 and the additional sensors 17 and 18, for setting each sensor to operate from time to time with a determinate configuration, depending on the different parameters to be detected, and for checking the operative state of each sensor and the exchange of the coded digital data among the microprocessor 1 and the various sensors when the different operative programs and functions in the appliance are carried out.

The operative program of the microprocessor 1 is further set also for effecting an exchange of coded digital data between it and either one or both the microprocessors 5 and 11, not only for the operation thereof as already indicated previously, but also for setting each microprocessor 5 or 11 or both the microprocessors 5 and 11 to operate from time to time with a determinate configuration, depending on the different parameters to be processed, as well as for recognizing all the codes of the controls of the operative programs and functions which have been selected, as described in the patent application n. PN2010A000006, and for checking the operative state of each microprocessor and the exchange of the coded digital data among the different microprocessors which have been activated during the carrying out of the different operative programs and functions in the appliance.

The invention claimed is:

1. Electric and electronic sensor means for selecting high resolution operative functions and programs of different types of media, connected to an interface device (2) for an appliance for processing a plurality of high resolution operative programs and functions of different types of media, integrated with a television receiver screen (7), for setting and performing said operative programs and functions and displaying them on said television receiver screen (7), said appliance comprising a first main master microprocessor (5) for controlling and managing informatics analog and digital data in general, and also comprising an electronic block (8) for reproducing the sounds of said operative programs and functions connected to said master microprocessor (5) and to said television receiver screen (7), said interface device (2) comprising a second main microprocessor (1) connected to said first microprocessor (5) and to first (12), second (13), third (14), fourth (15), fifth (16), sixth (17) and seventh (18) sensor means, adapted to select the operative programs and functions of said appliance, said appliance and said interface device (2) being connected to a system for processing in a real time the human voice for processing and controlling said plurality of operative programs and functions of different types of media, comprising a third microprocessor (11) adapted to be activated and de-activated by the human voice and connected to said first (5) and second (1) main microprocessors, for effecting an exchange of informatics data coded in a digital mode, wherein the operative programs and functions selected by said first, second, third, fourth, fifth, sixth and seventh sensor means, which are controlled and managed by said first main microprocessor (5), comprise also data of operative programs and functions for personal computers and television receivers of various kind; said first sensor means (12) comprising monoscopic video sensors, said second sensor means (13) comprising monoscopic video sensors with dichroic systems for stereoscopy, said third sensor means (14) comprising stereoscopic video sensors, said fourth sensor means (15) comprising movement sensors, said fifth sensor means (16) comprising multi-channel audio sensors, said sixth sensor means (17) comprising passive infrared sensors, and said seventh sensor means (18) comprising ambient brightness sensors, the operative programs of said second main microprocessor (1) being also set in advance for effecting an exchange of coded digital data among said sensors and each one of said sensors, so as to set each sensor to operate from time to time with a determinate configuration, depending on the different parameters to be detected, and for checking the operative state of each sensor as well as the exchange of the coded digital data among said second main microprocessor (1) and the different sensor means during the carrying out of the different operative programs and functions, and for effecting also an exchange of coded digital data between either one or both said first (5) and second (1) main microprocessors and also for setting each one or both said first (5) and second (1) main microprocessors to operate from time to time with a determinate configuration, depending on the different parameters to be processed, as well as for recognizing all the codes of the controls of the operative programs and functions which have been selected, and for checking also the operative state of each one of said first (5) and second (1) main microprocessors and the exchange of the coded digital data among them during the carrying out of the different operative programs and functions, said second main microprocessor (1) being further set with operative programs adapted to transmit the information received from said first through seventh sensor means to other external processors for a possible pre-processing thereof, wherein said external processors may be constituted by said first main microprocessor (5) or, through them, by other processing systems provided in the network, in a manner that the so processed data are then returned to said first main microprocessor (5) for the final processing and the recognizing of the given controls.

2. Electric and electronic sensor means according to claim 1, wherein said monoscopic video sensors of said first sensor means (12) comprise at least a color television camera, adapted to shoot moving color images of a space in front of the sensor, which color images have a middle and a high resolution, said monoscopic video sensors being color television cameras with CMOS sensors with 2 MPixel and over, interfacing said second main microprocessor (1) via a USB line, a line Ethernet with IP protocol or via composite video signals.

3. Electric and electronic sensor means according to claim 1, wherein said monoscopic video sensors with dichroic systems for stereoscopy of said second sensor means (13) comprise at least a monoscopic color television camera, integrated with a dichroic system for stereoscopy, adapted to shoot moving stereoscopic color images in a space in front of the sensor, which color images have a middle and a high resolution, said monoscopic video sensors with dichroic systems for stereoscopy being monoscopic color television cameras with CMOS sensors with 2 MPixel and over, integrated with a dichroic system for stereoscopy, interfacing said second main microprocessor (1) via a USB line, a line Ethernet with IP protocol, or via composite video signals.

4. Electric and electronic sensor means according to claim 1, wherein said stereoscopic video sensors of said third sensor means (14) comprise a stereoscopic color television camera, composed of an assembly of two monoscopic color television cameras, mechanically linked and synchronized to each other, adapted to shoot moving stereoscopic images of a space in front of the sensor, which color images have a middle and a high resolution, said stereoscopic video sensors being stereoscopic television cameras with CMOS sensors with 2 MPixel and over, interfacing said second main microprocessor (1) via a USB line, a line Ethernet with IP Protocol, or via composite video signals.

5. Electric and electronic sensor means according to claim 1, wherein said movement sensors of said fourth sensor means (15) comprise sensors adapted to detect the presence of moving objects within their operative range, which include sensors with microwave or ultrasound based active technology, integrated with passive infrared sensors, adapted to detect moving objects within a space of 1-5 meters, said movement sensors being sensors normally used in household alarm systems.

6. Electric and electronic sensor means according to claim 1, wherein said multichannel audio sensors of said fifth sensor means (16) comprise sensors adapted to receive sounds, adequately spaced and oriented, for receiving sounds coming from different areas of a space in front of the sensors, said multichannel audio sensors being directional microphones, mounted in such a position as to cover distinct and partially overlapped areas of the space in front of the sensors.

* * * * *